United States Patent [19]

Rainville

[11] Patent Number: 5,371,920
[45] Date of Patent: Dec. 13, 1994

[54] SAFETY SYSTEM OF ROLL GUARDS

[76] Inventor: Donald Rainville, 14275 Saratoga Ave., Saratoga, Calif. 95070

[21] Appl. No.: 7,091

[22] Filed: Jan. 21, 1993

[51] Int. Cl.⁵ .................. B60B 33/00; A61M 15/00
[52] U.S. Cl. ........................ 16/18 CG; 128/203.12
[58] Field of Search ............... 16/18 CG; 128/203.12

[56] References Cited

U.S. PATENT DOCUMENTS

| | | | |
|---|---|---|---|
| 672,138 | 4/1901 | Stockwell | 16/18 CG |
| 2,471,958 | 5/1949 | Humphreys | 16/18 CG |
| 2,566,853 | 9/1951 | Reinhardt | 16/18 CG |
| 2,975,468 | 3/1961 | McClellan | 16/42 R |
| 3,441,974 | 5/1969 | Dean | 16/18 CG |
| 3,818,542 | 6/1974 | Jones | 16/18 CG |
| 4,025,099 | 5/1977 | Virden | 16/18 CG |
| 5,170,528 | 12/1992 | Nauar et al. | 16/18 CG |
| 5,173,990 | 12/1992 | Owen | 16/18 CG |

FOREIGN PATENT DOCUMENTS 599244  3/1948  United Kingdom ............ 16/18 CG

OTHER PUBLICATIONS

Webster's Ninth New Collegiate Dictionary, 1984, pp. 278 and 695.

*Primary Examiner*—Carmine Cuda
*Attorney, Agent, or Firm*—Walter F. Wessendorf, Jr.

[57] ABSTRACT

A safety system of roll guards protecting an anesthesia machine's wheel assemblies from being obstructed or snagged by objects lying upon a floor surface or dangling above the floor surface that are in the path of movement. Each roll guard is loosely connected to part of the wheel assembly or anesthesia machine, and has a vertically upstanding cylindrical portion whose bottom rests upon the floor surface. The cylindrical portion surrounds and freely receives therein the wheel assembly, and has a top portion closed by a cap.

2 Claims, 4 Drawing Sheets

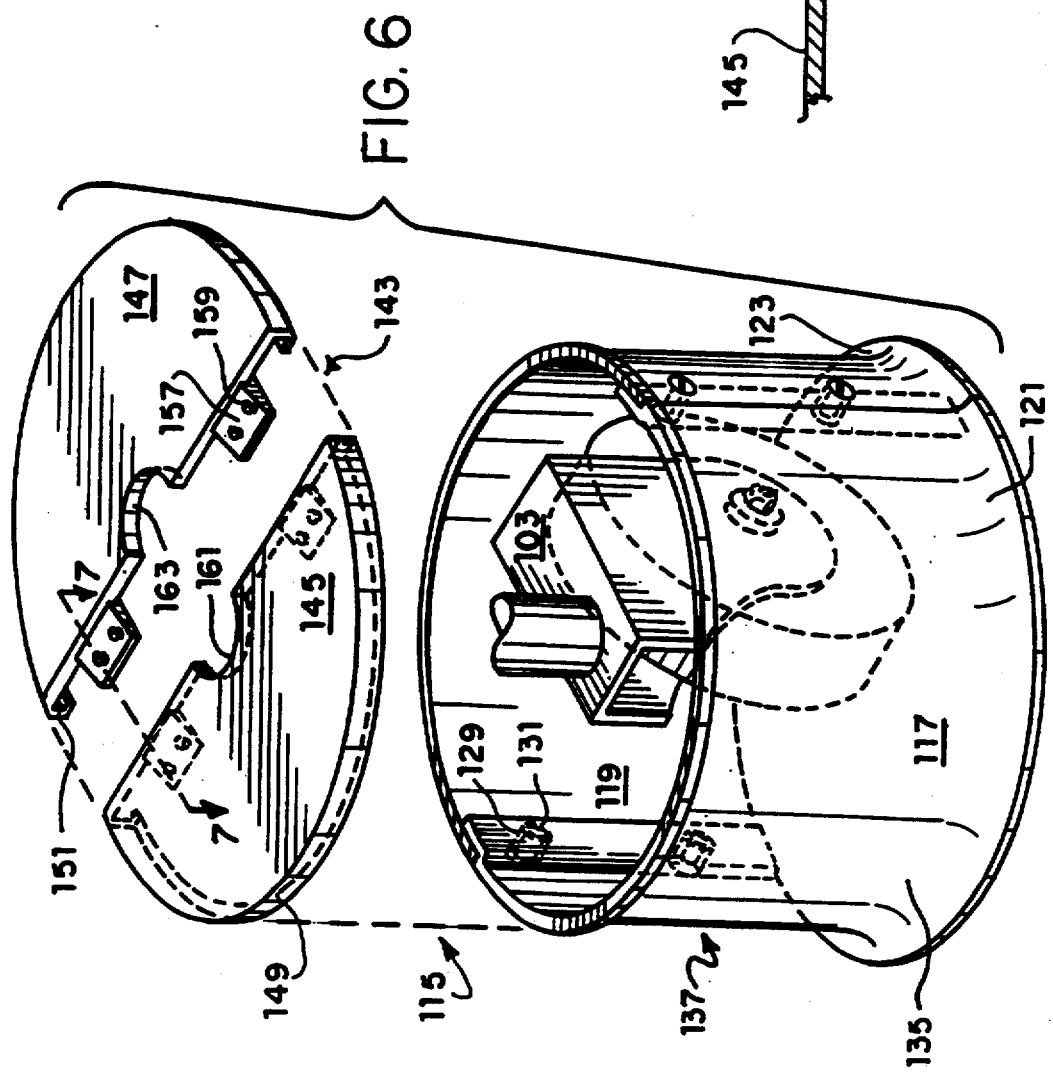

SAFETY SYSTEM OF ROLL GUARDS

BACKGROUND OF THE INVENTION

1. Technical Field

This invention relates to a safety system of roll guards for wheel assemblies that depend from a vehicle such as an anesthesia machine and support the vehicle on a floor surface for its movements in all directions on the floor surface. Each wheel assembly has and is protected by its own roll guard, unconnected with any part of such wheel assembly or with the vehicle. Each roll guard sweeps away any object that would otherwise be encountered by its wheel assembly on the floor surface and would obstruct, snag or prevent movement of the wheel on such floor surface. And any wheel assembly that would otherwise encounter a dangling object that would obstruct, snag or prevent movement of the wheel on the floor surface is swept away by its roll guard.

2. Background

The problem in the art to which this invention appertains is further rolling or turning movement being prevented by an anesthesia machine, having depending wheel assemblies mounting wheels, when anyone, or more, of the numerous electrical cords, electrical cables, electric wires, hoses, tubes and tubings (hereinafter referred to as "objects"), and having a variety of sizes ranging from 3/32" to ½" in diameter and lengths ranging from 3 feet to 19 feet, is in the path of the anesthesia machine's rolling or turning movement, whether a portion of such object is lying upon the floor surface or whether a portion of such object is in proximate dangling relationship, by a wheel snagging the portion of such object lying upon the floor surface and thereby preventing continued rolling or turning movement of such snagged wheel or by a portion of the wheel assembly snagging the portion of such object in proximate dangling relationship thereto to thereby block and prevent continued rolling or turning movement of the wheel mounted by such wheel assembly.

The anesthesia machine has to roll or turn freely on its its floor surface for the following reasons:

1. Instant access to the anesthesia machine is necessary for:
   a. Safety inspection to make certain that the air hoses, electrical plugs and outlets are properly connected, and which procedure must be performed every morning pursuant to prescribed guidelines.
   b. Turning on the peripheral electrical equipment that has on-off switches located on the rear of the anesthesia machine.
   c. Adjusting the alarm volume switches located to the rear of the peripheral electrical equipment.
   d. Trouble-shooting electrical problems.
   e. Calibrating carbon dioxide gas monitors.
   f. Changing anesthesia gas containment cylinders located on the back of the anesthesia machine.

2. The position of the anesthesia machine, in relation to the operating table, changes with the practitioner, some of whom prefer the anesthesia machine on the right, some on the left, some perpendicular to the O.R. (operating room) table, some a little less than perpendicular, some a little more, etc. Basically, the machine's location has to be adjusted for accessibility and comfort of the practitioner.

3. An anesthesia machine may have to be moved from its working position when a patient is brought into an O.R. on a stretcher in order that the head end of the stretcher is even with the head end of the O.R. table. This problem arises because of the limited space available in the O.R. for all the equipment required to perform today's highly sophisticated operations. This procedure is repeated in reverse order when the patient is moved from the O.R. table to his stretcher.

4. When a patient is finally situated on the O.R. table, the anesthesia-machine's position may have to be readjusted so that the anesthesia provider can reach both the patient and his anesthesia machine without moving his own body.

5. After the patient has been anesthetized, the position of the patient on the O.R. table may need to be changed to accommodate the surgery, such as sitting, lateral, prone or lithotomy position, which often requires the anesthesia machine to be brought closer to the patient in order that the anesthesia breathing circuit, usually 30 to 36 inches in length, will reach the patient's airway.

6. In certain surgeries, the O.R. table is rotated 90° or more in order that the surgeon can have good access to the upper body areas of the head, neck and shoulders. In such instances, the anesthesia machine must follow the patient to prevent the breathing circuit from being disconnected which could cause the patient to become hypoxic (lack of oxygen). At the end of these kinds of surgeries, the O.R. table must be returned to its original position in order that the anesthesia provider can properly support the patient's airway when anesthesia is discontinued. The anesthesia machine must be able to follow such return movement.

7. During surgery, rapid access to the back of the anesthesia machine may be necessary to replace depleted oxygen tanks if a mainline oxygen source failure occurs. A mainline nitrous oxide gas source failure requiring depleted tank replacement would require moving the machine to a more accessible position.

8. Rapid access to the back of the anesthesia machine would be necessary in the event of a sudden electrical power failure to allow the practitioner to evaluate the machine for power cord disconnection.

9. An anesthesia machine is moved when so required for another anesthesia provider to travel behind the machine in order to get to the anesthesia care area to assist in anesthesia care, give consultations, assist in emergency situations and to provide relief for breaks and meals.

10. An anesthesia machine often has to be repositioned to allow x-ray access to the O.R. table from the head area.

11. When the anesthesia machine needs servicing and/or equipment maintenance, it is usually moved to a location or other room to afford access to all its sides.

12. If, during surgery, the anesthesia machine has a serious equipment failure, such as a patient ventilator failure, the failed machine would be rolled out for removal with its place being taken by rolling in a new anesthesia machine.

13. An anesthesia machine is top heavy, and, if a person were to give the machine a hard shove to move it and its wheels were blocked or obstructed, such person not only can injure himself, but also such hard shove could cause the top-heavy machine to topple over.

SUMMARY OF THE INVENTION

Accordingly, the objects of the invention are to contribute to the solutions of the discussed problems of the art by providing a safety system of cylindrical roll guards for the wheel assemblies. Each wheel assembly comprises a spindle that depends from the bottom of the anesthesia machine's cabinet and has a wheel mounted on an axle carried by a yoke fixed to the bottom of the spindle. The wheel assemblies hence mount wheels for rolling or turning movements in all directions on the floor surface. Each wheel assembly and its inclusive wheel is surrounded and protected laterally by its own cylindrical roll guard that is in vertical free upstanding relationship from the floor surface, and is not connected to any part of the wheel assembly, its inclusive wheel, or the anesthesia machine. The cylindrical roll guard extends vertically from the floor surface to just below the bottom of the anesthesia machine's cabinet with its top open end closed by a top cap, with clearance provided between the top surface of the cap and the bottom surface of the cabinet's bottom. Cross-sectionally, the spindle is round. The top cap receives the spindle therethrough via a concentric opening of sufficiently greater diameter to provide an annular open space between the spindle and the top cap's opening. In the course of the wheel's rolling or turning movement, the spindle contacts and engages the top cap's concentric opening, thereby moving the roll guard in the same direction of movement as the wheel to make contact with and sweep away the portion of any object that lies upon the floor surface with which the wheel would otherwise make contact with and become snagged. The cylindrical roll guard, closed by its top cap, makes contact with and sweeps away or moves away that portion of any object in proximate dangling relationship to a portion of the wheel assembly with which such portion of the dangling object would otherwise make contact with and snag.

BRIEF DESCRIPTION OF THE DRAWINGS

These objects and other objects of the invention should be discerned and appreciated from the detailed description of the preferred embodiment taken in conjunction with the drawings, wherein like reference numerals refer to similar parts throughout the several views, in which:

FIG. 6 is an exploded perspective view; and

FIG. 7 is a cross-sectional view taken in the direction of the arrows 7—7 in FIG. 6.

DETAILED DESCRIPTION OF THE PREFERRED EMBODIMENT

Figure 1:
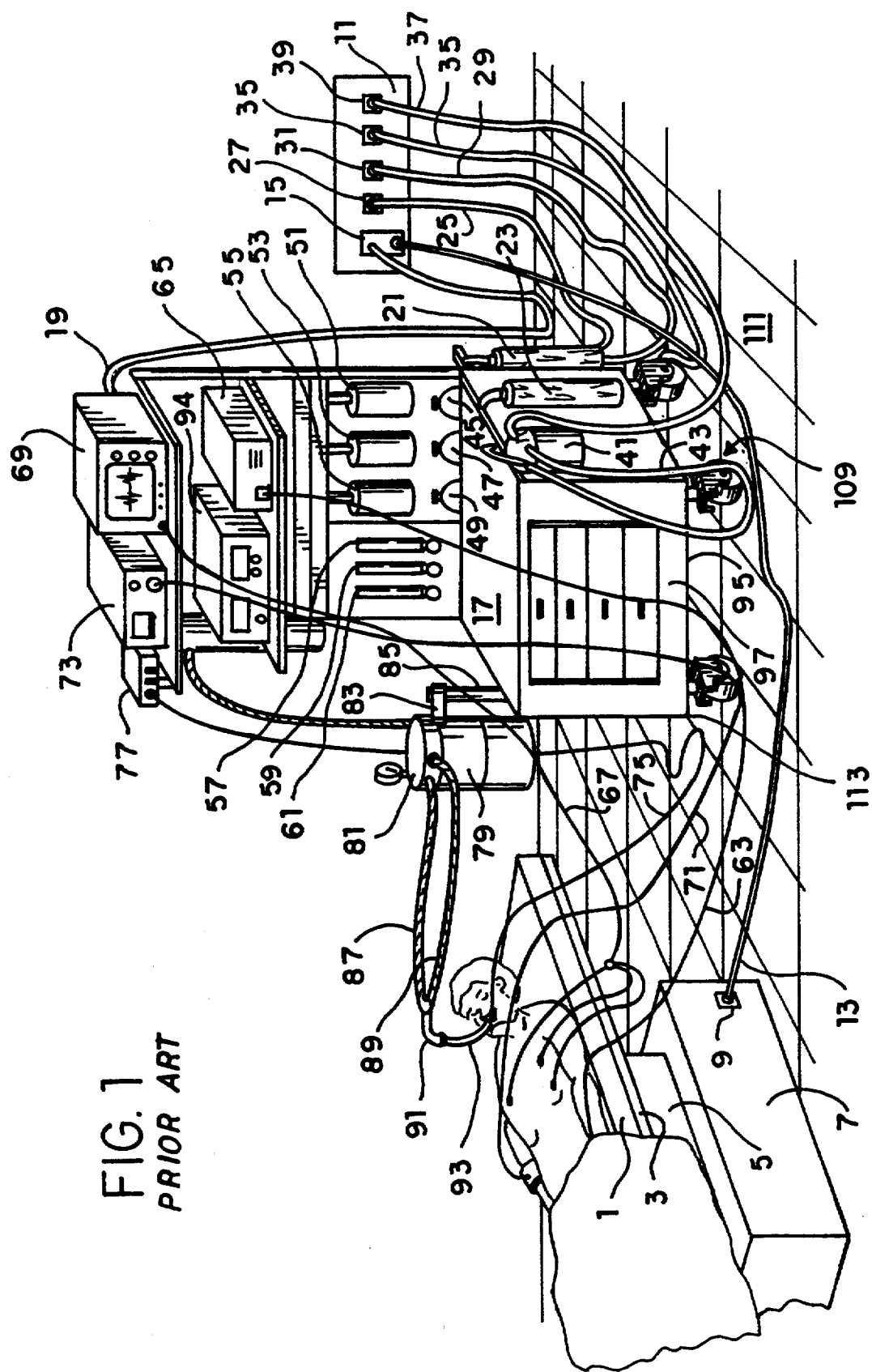
FIG. 1 is a perspective view depicting a conventional O.R. environment.

FIG. 1 of the drawings depicts a conventional O.R. environment, to wit: a patient lying upon an O.R. mattress 1, supported by an O.R. table 3, its hydraulic pedestal 5 and base 7; an O.R. electric power inlet box 9; a wall-mounted electrical and medical gases outlet panel 11; an O.R. table electrical power cord 13 which is connected to the wall outlet 15 and runs to the power inlet box 9; the anesthesia machine 17; the main electrical power supply cord 19 that runs from the wall outlet 15 to the anesthesia machine 17; the "E" cylinder 21 for oxygen; the "E" cylinder 23 for oxygen; the connecting hose 25 for air supply running from the wall outlet 27 for medical air to the anesthesia machine 17; the connecting hose 29 for nitrous oxide supply running from the wall outlet 31 to the anesthesia machine 17; the connecting hose 33 for oxygen supply running from the wall outlet 35 to the anesthesia machine 17; the connecting hose 37 for suction supply running from the wall outlet 39 for suction to the suction containment canister 41; the suction tubing 43 from the canister 41 for the patient; the "E" cylinder 45 for nitrous oxide; the "E" cylinder 47 for nitrous oxide; the "E" cylinder 49 for medical air; the forane vaporizer 51; the ethrane vaporizer 53; the halothane vaporizer 55; the oxygen flow meter 57; the nitrous oxide flow meter 59; the medical air flow meter 61; the pulse oximetry cable 63 running from the electric pulse oximetry machine 65 to the patient; the electrocardiograph cable 67 running from the electrocardiographic machine 69 to the patient; the blood pressure cuff inflation hose 71 running from the electric blood pressure monitor 73 to the patient; the esophageal temperature probe wire 75 running from the electric temperature monitor 77 to the patient; the carbon dioxide absorption canister 79, having a delivery head 81, swivel-mounted via a swivel bracket 83 mounted on a support post 85, carried by the anesthesia machine 17, with inflow and outflow tubing branches 87 and 89 running from the delivery head 81 to a "Y" piece connector 91 that connects to an endotracheal tube 93; and a continuous carbon dioxide sampling machine 94.

The bottom 95 of the anesthesia machine's cabinet 97 has recessed therein four conventional spindle housings 99, each of which receives therein, in pivotally mounting relationship, the top portion of a spindle 101 whose bottom is fixed to a yoke 103 having lateral sides. A wheel 105 is mounted within the yoke 103 for rotation about a horizontally disposed axle 107 carried by the lateral sides of the yoke 103. The axle 107 is offset from the spindle 101 such that the wheel 105 and yoke 103 will swivel to the position shown in FIG. 2, with the axle 107 located behind the spindle 101 when the anesthesia machine is moved forwardly. As used herein, "wheel assembly" is generally referred to by reference numeral 109 and means the spindle 101, yoke 103, wheel 105 and axle 107. The four wheels 105 support the anesthesia machine 17 upon the flat floor surface 111 for movement of the anesthesia machine 17 in all directions upon the flat floor surface 111.

As used herein, "object(s)" include the cord(s), hose(s), tubings(s), cable(s) and wire(s) described herein along with reference numerals. For reason of the many required movements of an anesthesia machine 17, in all directions upon the flat floor surface 111 during the course of an operation, as explained under "2. Background" herein, the objects not only lie on the flat floor surface 111, but also are in dangling relationships above the flat floor surface 111. A wheel 105 is snagged upon its coming into contact with an object lying upon the flat floor surface 111 that is in the path of the anesthesia machine's movement and with further movement obstructed. A spindle 101 of the anesthesia machine 17 would be obstructed and blocked from further movement when a spindle 101 comes into contact with an object in dangling relationship above the flat floor surface 111. In addition to which, a yoke 103 or a bottom corner 113 of the anesthesia machine's cabinet 97 can be snagged by such a dangling object.

The problems described under "2. Background" are aggravated because of the additional needs in an operation for cable hookups for arterial lines, central venous pressure lines and pulmonary artery lines; an electrical cord powering an inspired gas humidifier; electrical cords from intravenous fluid warmers and intravenous medication control pumps; water hoses running to temperature controlled heating blankets; electrical wires connecting and grounding the patient to an electrocautery unit; and electrical wires running to video cameras, microscopes, etc.

Figure 2:
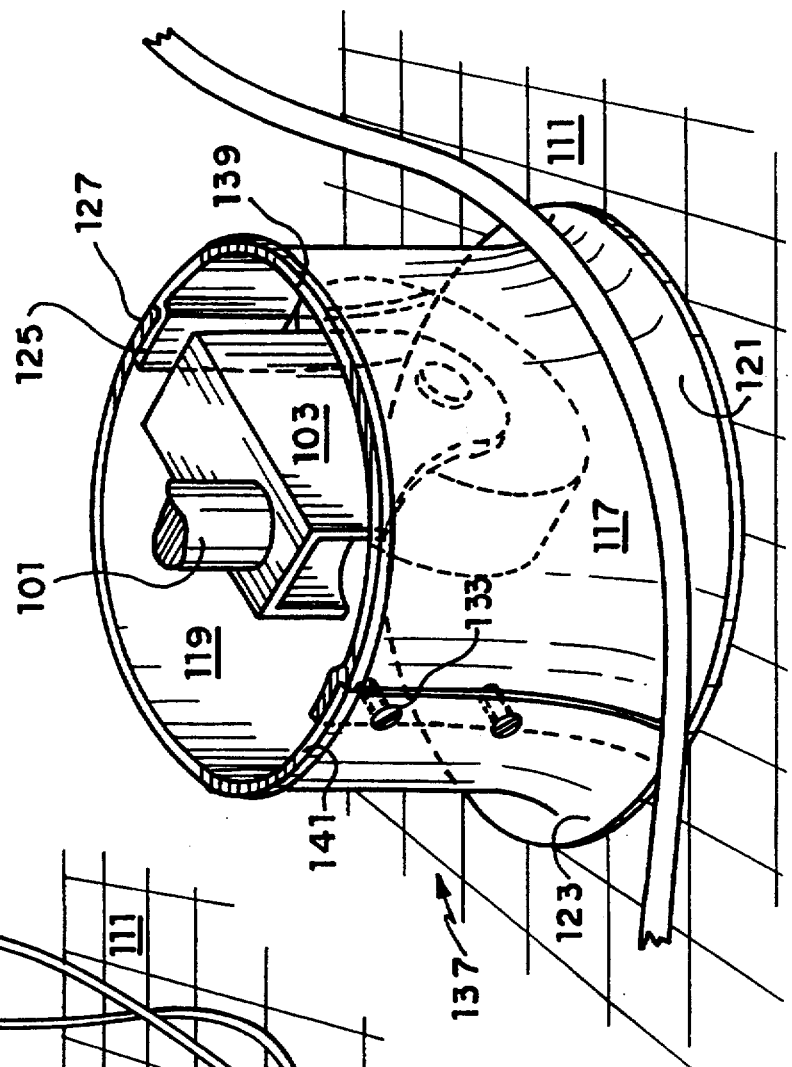
FIG. 2 is a perspective view showing portions of objects lying upon the floor surface and snagged by the front wheels mounted by their respective wheel assemblies that depend from the cabinet bottom of the anesthesia machine.

FIG. 2 shows the front wheels 105 snagged upon coming into contact with objects lying upon the flat floor surface 111 in the course of forward movement of the anesthesia machine 17.

Figure 3:
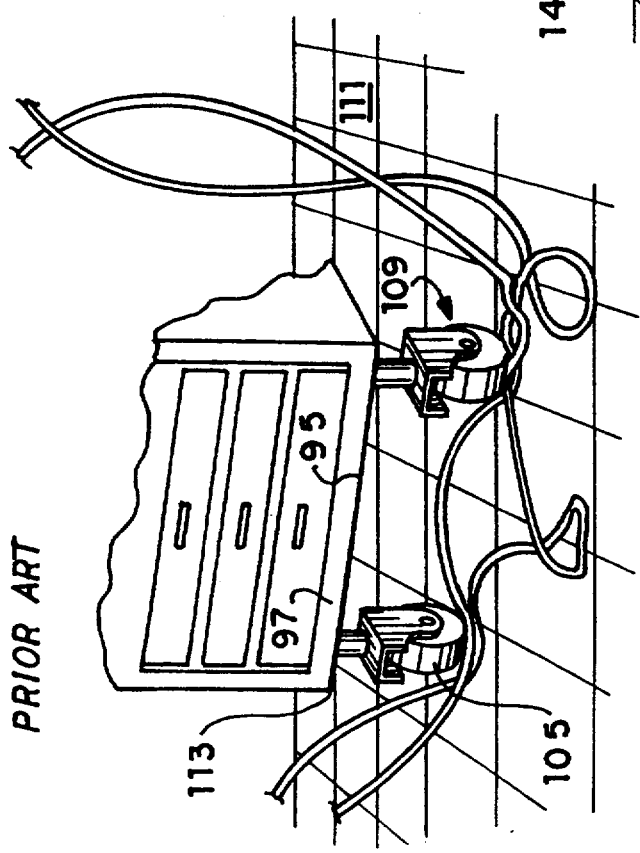
FIG. 3 is a perspective view of a roll guard (without its top cover) sweeping away an object.
Figure 5:
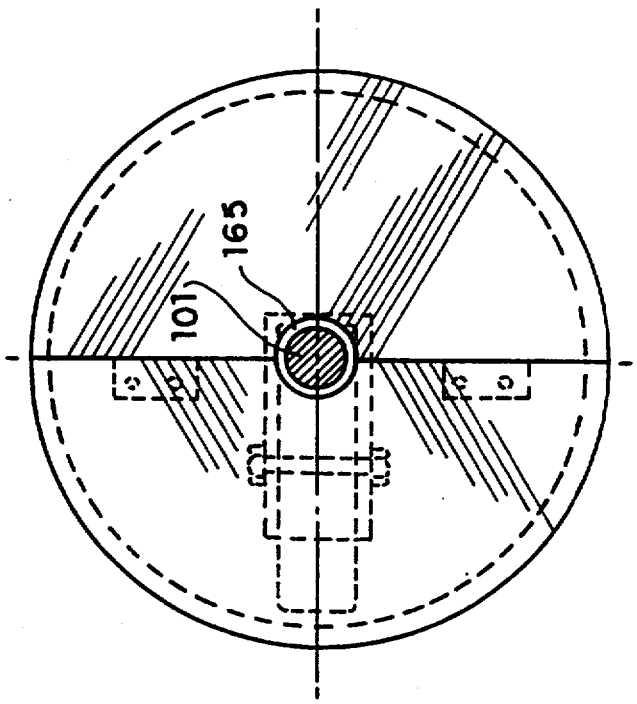
FIG. 5 is a top plan view.

FIG. 3 shows a wheel assembly 109 protected by its roll guard 115 which is sweeping away, in the path of the movement of the wheel 105, an object lying upon the flat floor surface 111.

With reference to FIGS. 3, 4, 5, 6 and 7 of the drawings, the roll guard 115, made of plastic or other suitable material, has two halves 117 and 119 whose respective bottoms 121 and 123 are correspondingly flared out. One half 117 has two vertical offset flanges 125 that complementally receive the lateral end portions 127 of half 119. Half 119 has receiving holes 129 aligned with tapped holes 131 formed in half 117. Screws 133 disposed through the receiving holes 129 are threadingly engaged sufficiently with the tapped holes 131 such that the heads of the screws 133 will be flush with the exterior surface 135 of half 119. Such assembly completes the vertically upstanding cylindrical portion 137 of the roll guard 115. For operative use of such cylindrical portion 137, the anesthesia machine 17 Can be appropriately raised and a wheel assembly 109 lowered within such cylindrical portion 137 to the flat floor surface 111; or, more easily, the wheel 105 of such assembly 109 can remain on the flat floor surface 111 with such cylindrical portion 137 being simply assembled around its wheel assembly 109. The top portions 139 and 141 of the respective halves 117 and 119 have corresponding outturned rims. The top cap 143 has two semicircular portions 145 and 147 having respective inturned flanges 149 and 151 complemental with the outturned rims 139 and 141. Semicircular portion 145 has beveled portions 153 with depending detents 155. Semicircular portion 147 has two laterally projecting beveled portions 157 having complemental detent recesses 159. The beveled portions 153 are in complemental correspondence with the beveled portions 157. The detents 155 are aligned with the detent recesses 159. To complete the assembly of the top cap 143, one simply slides its semicircular portions 145 and 147 together sufficiently such that the inturned flanges 149 and 151 engage the outturned rims 139 and 141, and the detents 155 engage the aligned detent recesses 159. The semicircular portions 145 and 147 have aligned semicircular openings 161 and 163, respectively, which have like radii such that when the semicircular portions 145 and 147 are assembled, the openings 161 and 163 define a diametral opening concentric with the spindle 101 of the wheel assembly 109 and greater than the diameter of the spindle 101 such that the diametral opening provides an annular clearance space 165 between the diametral opening and the spindle 101.

Figure 4:
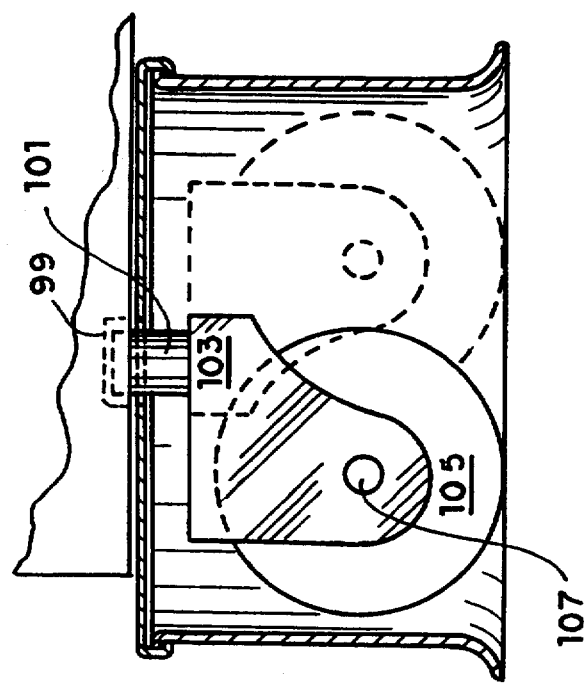
FIG. 4 is a side elevational view.

As shown in FIG. 4, it should be noted that with the assembly of the top cap 143 completed, the vertical height of vertically upstanding cylindrical portion 137 of the roll guard 115 with its halves 117 and 119 resting upon the flat floor surface 111 is such that there is a vertical clearance of 1/16" or less between the top surface of the cap 143 and the bottom 95 of the anesthesia machine 17 to prevent a small dangling object, such as a small dangling wire, from entering into such 1/16" clearance to contact and obstruct or snag the spindle 101 or from looping around and snagging a bottom corner 113 of the anesthesia machine 17.

With a spindle that cross-sectionally is square, rectangular or of other configuration, it is within the concept of this invention that the two semicircular portions 145 and 147 would have a central opening configured to accommodate such spindle that is square, rectangular or of other configuration, cross-sectionally, and concomitantly to provide a clearance therebetween.

I claim:

1. A safety system of roll guards in combination with an anesthesia machine each of whose bottom corners has a bottom surface and a wheel assembly depending therefrom and in swivel-mounted relationship therewith for supporting the anesthesia machine for rolling movement in all directions upon an operating-room (OR) floor surface in an OR environment in which a patent is lying upon an OR table, with an electrical power cord running from an OR outlet panel to the OR table, the anesthesia machine carrying equipment comprising oxygen, nitrous-oxide and medical air cylinders, suction-containment and carbon-dioxide canisters, forane, ethrane and halothane vaporizers, oxygen, nitrous-oxide and medical-air flow meters, electric-pulse-oximetry, electro-cardiographic and continuous-carbon-dioxide-sampling machines, electric-blood-pressure and electric-temperature monitors, a main-electrical-power-supply cord, a medical-air-supply hose and a nitrous -oxide-supply hose running from the wall outlet to the anesthesia machine, a suction-supply hose running from the wall outlet to the suction-containment canister, and a suction tubing, an oximetry-machine cable, an electro-cardiographic machine cable, a blood-pressure-cuff-inflation hose and an esophageal-temperature-probe wire running to the patient from the containment canister, electric-pulse-oximetry machine, electro-cardiographic machine, electric-blood pressure monitor and electric-temperature monitor, respectively, each roll guard being associated with its own wheel assembly, each roll guard having an upstanding cylindrical portion terminating in a top portion and each roll guard having a flat, horizontal top cap, each upstanding cylindrical portion surrounding a wheel assembly and its top cap closing the top portion of the upstanding cylindrical portion, the closed top cap being loosely connected with its associated wheel assembly such that, upon movement of the wheel assembly upon the floor surface, the wheel assembly physically contacts the top cap and causes the roll guard to follow the direction of movement of the wheel assembly to thereby make contact with and sweep away any cord, hose, cable, tubing or wire, whether lying upon the floor surface or in proximate relationship to the roll guard, in the path of movement of the wheel assembly, the top cap having a top surface extending horizontally beyond its respective bottom corner of the anesthesia machine, the top surface of the top cap and the bottom surface of the bottom corner defining and providing a minimal vertical clearance to prevent any dangling cord, hose, cable, tubing or wire from entering such minimal vertical clearance and snagging or obstructing the bottom corner of the anesthesia machine or any part of the wheel assembly, the wheel assembly having a portion that physically contacts an opening in the top cap upon movement of the wheel assembly, upon the movement of the wheel assembly upon the floor surface, that causes the roll guard to follow the direction of movement of the wheel assembly, and the opening in the top cap being sufficiently greater than that wheel assembly's portion to provide a clearance space therebetween and thereby loose connection between the top cap's opening and that wheel assembly's portion.

2. A safety system in accordance with claim 1, wherein the upstanding cylindrical portion has a flared-out bottom.

* * * * *